UNITED STATES PATENT OFFICE.

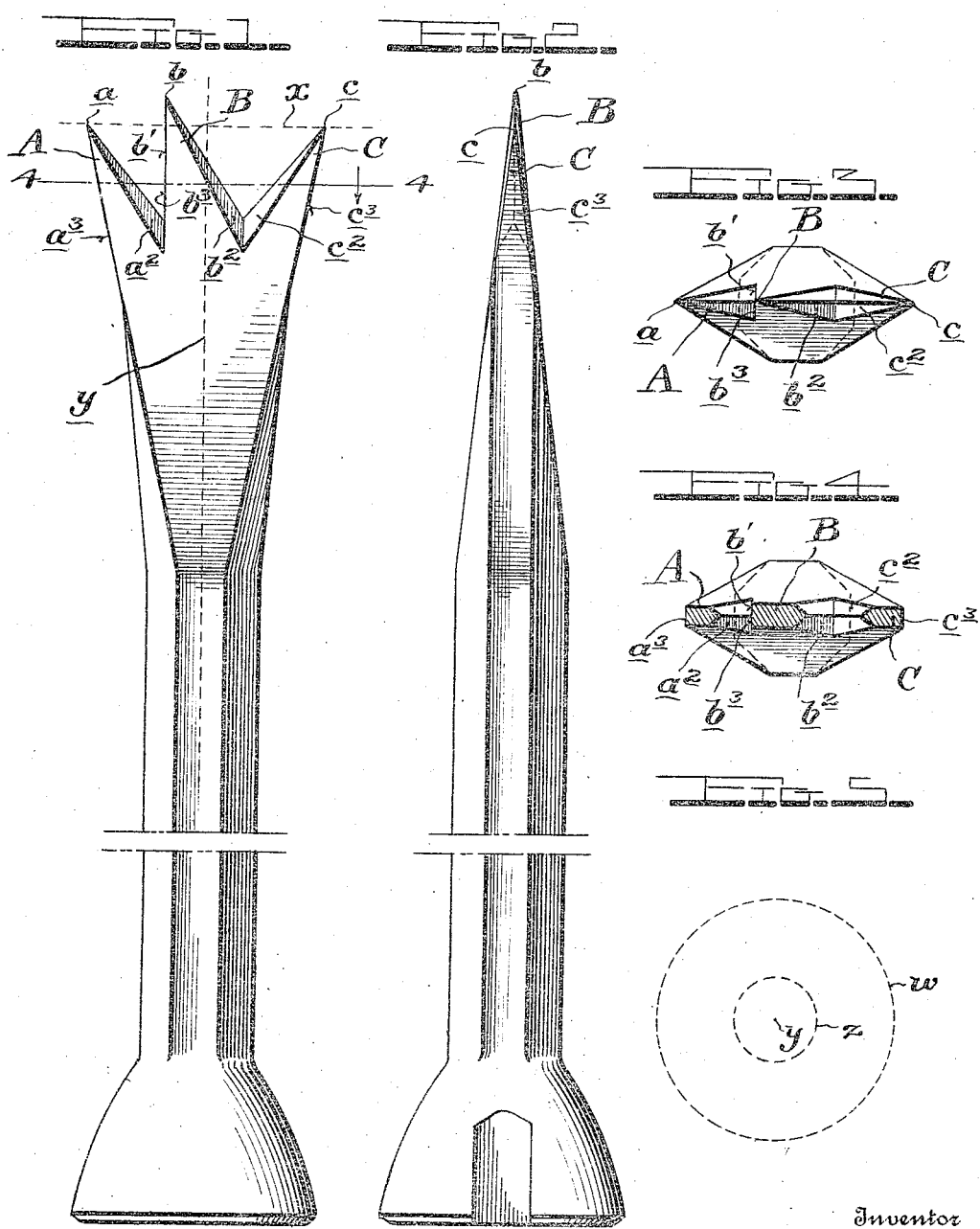

JOSEPH BUSCAVAGE, OF TAMAQUA, PENNSYLVANIA.

HAND-DRILL.

1,140,572.

Specification of Letters Patent.

Patented May 25, 1915.

Application filed November 18, 1914. Serial No. 872,733.

*To all whom it may concern:*

Be it known that I, JOSEPH BUSCAVAGE, a citizen of the United States, residing at Tamaqua, in the county of Schuylkill and State of Pennsylvania, have invented certain new and useful Improvements in Hand-Drills; and I hereby declare that the following is a full, clear, and exact description thereof, reference being had to the accompanying drawings, which form part of this specification.

This invention is a novel improvement in hand drills of the type commonly used by coal miners in drilling holes in coal; and the object of the invention is to produce a superior hand drill which will be very efficient in action and by which a workman can drill a hole more rapidly and with less manual labor than is necessary with an ordinary type of drill.

The invention provides a drill having a peculiarly formed cutting edge by which the drill is adapted to bore or cut its way into the material being drilled more rapidly, easily and efficiently than the heretofore known types of drills.

The invention consists essentially in the novel construction of the cutting end of the drill, and the accompanying drawings illustrate a hand-drill embodying the invention, and I will explain the essential features thereof with reference to said drawings.

In the drawings Figure 1 is a broad side, or face, view of the cutting end of the drill. Fig. 2 is a side view of Fig. 1. Fig. 3 is an end view of the cutting edge of the drill. Fig. 4 is a detail transverse section on line 4—4, Fig. 1. Fig. 5 is a diagram illustrating the action of the drill when in use.

The drill proper should be made of steel of any desired size and length, and is preferably made of polygonal-sided rod steel. The cutting end of the drill is flattened, tapered and broadened as indicated in Figs. 1 and 2, so that the extreme width of the broad cutting edge of the tool will be greater than the diameter of the body thereof. This broadened cutting edge comprises three cutting teeth A, B and C, of which teeth A and C are outermost and tooth B is intermediate teeth A and C. The apexes or points $a$ and $c$ of the teeth A and C are approximately in the same plane perpendicular to the axis of the drill, as indicated by the dotted line $x$ in Fig. 1, and at equal distances from the axial line of the tool (indicated by the dotted line $y$ in Fig. 1). The apex or point $b$ of the tooth B projects above or beyond the plane $x$ of the teeth A and C, and the distance between the points $a$ and $b$ is substantially equal to about one-half the distance between the points $b$ and $c$.

The three teeth A, B and C are triangular viewed from the face side of the drill, as shown in Fig. 1, and the side $b'$ of the tooth B adjacent the tooth A is substantially parallel with the axis of the tool body or handle of the tool, and stands to one side of the longitudinal axis of the tool, (indicated by the dotted line $y$ in Fig. 1.) By locating the point $b$ of tooth B in advance of the points of teeth A and C and to one side of the center of the cutting edge of the drill, and having the side $b'$ of tooth B straight, the tooth B will tend to cut a small axial bore in the material in advance of the larger bore cut by the points $a$ and $c$ of teeth A and C, and the points $a$, $b$, $c$ will each strike a new place in the material each time the drill is partially rotated. The opposed sides of the teeth B and C are beveled on both sides as indicated at $b^2$, $c^2$ respectively, so as to make them cut more easily and also to increase the sharpness of the points $b$, $c$ of said teeth. The side of the tooth A opposite the face $b'$ of tooth B is also beveled as shown, to form a cutting edge $a^2$.

The rear or non-working edges of the teeth A, B and C are preferably squared as indicated at $a^3$, $b^3$, $c^3$ in Fig. 4 to leave as much metal as possible in each tooth without interfering with the efficient cutting action thereof, and such angular edges also assist in breaking up the material. It will be observed that the cutting edges $a^2$, $b^2$, $c^2$ of the several teeth will all come into effective operation when the drill is thrust directly and longitudinally forward. It will also be observed that when the tool is thrust forward the point $b$ of tooth B will be the first to engage an opposed surface, and will penetrate this surface slightly before the points $a$ and $c$ engage such surface.

In operation the drill is reciprocated so as to repeatedly drive its cutting edges against the surface to be drilled and at each reciprocation the drill should be slightly rotated on its axis and this will result in the point $b$ traversing a circle around the axial line $y$ of the drill (as indicated by the dotted line $z$ in Fig. 5,) while the points $a$ and $c$ will traverse a larger circle, indicated by the dotted line $w$ in Fig. 5. The effect is to rapidly disintegrate the material, as the point $b$ first punctures the same, then the points $a$ and $c$ tend to cut the outer wall of the bore and also to force material inward toward the puncture made by the point $b$, and this results in most effective and rapid cutting of the material, and facilitates the entrance of the drill into such material, as has been demonstrated by actual practice.

While the drill is particularly designed for use by coal miners and as a hand-drill, it can be embodied in drills operated by power. The drills can be made of any desired size to drill holes of any desired diameter.

What I claim is:

1. A drill adapted to be operated by hand and comprising a bar having a cutting edge on one end provided with three integral triangular cutting teeth arranged in line, the points of the two outer teeth being in substantially the same plane on a line drawn perpendicular to the axis of the drill, and the central tooth being located at one side of the axial line of the drill and projecting beyond the plane of the points of the two outer teeth, substantially as described.

2. A drill for the purpose specified having its working end tapered and broadened and the edge thereof divided into three irregularly spaced triangular teeth, the points of the two outermost teeth being in substantially the same plane on a line drawn perpendicular to the axis of the drill, and the point of the intermediate tooth projecting beyond the plane of the said line, the opposed sides of the central tooth and the farthest removed outer tooth being sharpened, and the inner side of the other outer tooth being also sharpened, substantially as described.

In testimony that I claim the foregoing as my own, I affix my signature in presence of two witnesses.

JOSEPH BUSCAVAGE.

Witnesses:
P. GUDASLER,
LEON NAVITSKY.